United States Patent
Ishii et al.

(10) Patent No.: US 7,265,871 B2
(45) Date of Patent: Sep. 4, 2007

(54) IMAGE FORMATION PROCESSING METHOD AND IMAGE FORMATION PROCESSING APPARATUS

(75) Inventors: Akira Ishii, Ashigarakami-gun (JP); Kunio Yamada, Ebina (JP); Makoto Hirota, Ebina (JP); Yasuki Yamauchi, Ashigarakami-gun (JP); Toru Misaizu, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 932 days.

(21) Appl. No.: 10/382,900

(22) Filed: Mar. 7, 2003

(65) Prior Publication Data

US 2004/0032601 A1    Feb. 19, 2004

(30) Foreign Application Priority Data

Aug. 19, 2002  (JP)  ............................. 2002-238578

(51) Int. Cl.
*H04N 1/58* (2006.01)
*G06K 9/46* (2006.01)

(52) U.S. Cl. .................. 358/1.9; 358/3.27; 358/530; 382/199; 382/266; 399/156; 399/157

(58) Field of Classification Search ............... 358/1.9, 358/3.27, 530; 382/199
See application file for complete search history.

(56) References Cited

U.S. PATENT DOCUMENTS

| | | | | |
|---|---|---|---|---|
| 4,459,344 A | * | 7/1984 | Jacob ..................... 430/123.5 |
| 4,871,408 A | * | 10/1989 | Honma et al. ................ 156/83 |
| 5,475,507 A | * | 12/1995 | Suzuki et al. ............... 358/500 |
| 5,485,288 A | * | 1/1996 | Kamei et al. ............... 358/530 |
| 5,485,529 A | * | 1/1996 | Kurita et al. ............... 382/162 |
| 5,677,049 A | * | 10/1997 | Torii ....................... 428/32.73 |
| 6,791,590 B2 | * | 9/2004 | Misaizu et al. ............. 347/115 |
| 6,993,269 B2 | * | 1/2006 | Yamauchi et al. .......... 399/130 |
| 2004/0037583 A1 | * | 2/2004 | Machida ..................... 399/100 |

* cited by examiner

*Primary Examiner*—Twyler Lams
*Assistant Examiner*—Pawandeep S Dhingra
(74) *Attorney, Agent, or Firm*—Oliff & Berridge, PLC

(57) ABSTRACT

An image formation processing method for forming an image to be raised with color toners on a raised portion of an expandable toner which is formed on a recording sheet according to an original image, comprising extracting a contour section of the image to be raised from the original image, and changing a color of the extracted contour section to enhance the image to be raised.

6 Claims, 13 Drawing Sheets

[E.G.: SHADOW EXTENDED TO THE LOWER RIGHT OF THE OUTSIDE OF THE RAISED PORTION BY LIGHT FROM TOP LEFT]

[GRADATION OF OUTSIDE OF RAISED PORTION]

IMAGE FORMATION PROCESSING METHOD AND IMAGE FORMATION PROCESSING APPARATUS

BACKGROUND OF THE INVENTION

1. Field of the Invention

The present invention relates to an image formation apparatus such as a printer or a copy machine which applies an electrophotographic method or an electrostatic recording method capable of forming a three-dimensional image with an expandable toner, and more particularly to an image formation processing method and image formation processing apparatus which can form a three-dimensional print having a printed image with a visually enhanced three-dimensional appearance.

2. Description of the Related Art

Conventionally, there have been proposed, for example, Braille print and a three-dimensional print as usage of an achromatic color (white) expandable toner.

A conventional Braille print is achieved by an effect of an expandable toner only, but a visually satisfactory three-dimensional print cannot be produced by only raising the image of the expandable toner.

As described above, there is conventionally a disadvantage that a visually satisfactory three-dimensional print cannot be obtained by only raising the image of the expandable toner.

Under the circumstances described above, the present invention provides an image formation processing method and image formation processing apparatus which can produce a three-dimensional print having a printed image with a visually enhanced three-dimensional appearance.

SUMMARY OF THE INVENTION

The present invention has been made in view of the above circumstance, and an aspect of the present invention is an image formation processing method for forming an image to be raised with color toners on a raised portion of an expandable toner which is formed on a recording sheet according to an original image, comprising extracting a contour section of the image to be raised from the original image; and changing a color of the extracted contour section to enhance the image to be raised.

Another aspect of the present invention is an image formation processing apparatus for forming an image to be raised with color toners on a raised portion of an expandable toner which is formed on a recording sheet according to an original image, comprising an extraction unit which extracts a contour section of the image to be raised from the original image; and an image processing unit which changes a color of the contour section extracted by the extraction unit to enhance the image to be raised.

According to the present invention, a three-dimensional print having a visually enhanced three-dimensional appearance can be produced by extracting the contour section of the image to be raised from the original image and changing the color of the extracted contour section to enhance the image to be raised.

BRIEF DESCRIPTION OF THE DRAWINGS

Preferred embodiments of the present invention will be described in detail based on the following figures, wherein.

DESCRIPTION OF THE PREFERRED EMBODIMENTS

Embodiments of the present invention will be described in detail with reference to the accompanying drawings.

Figure 1:
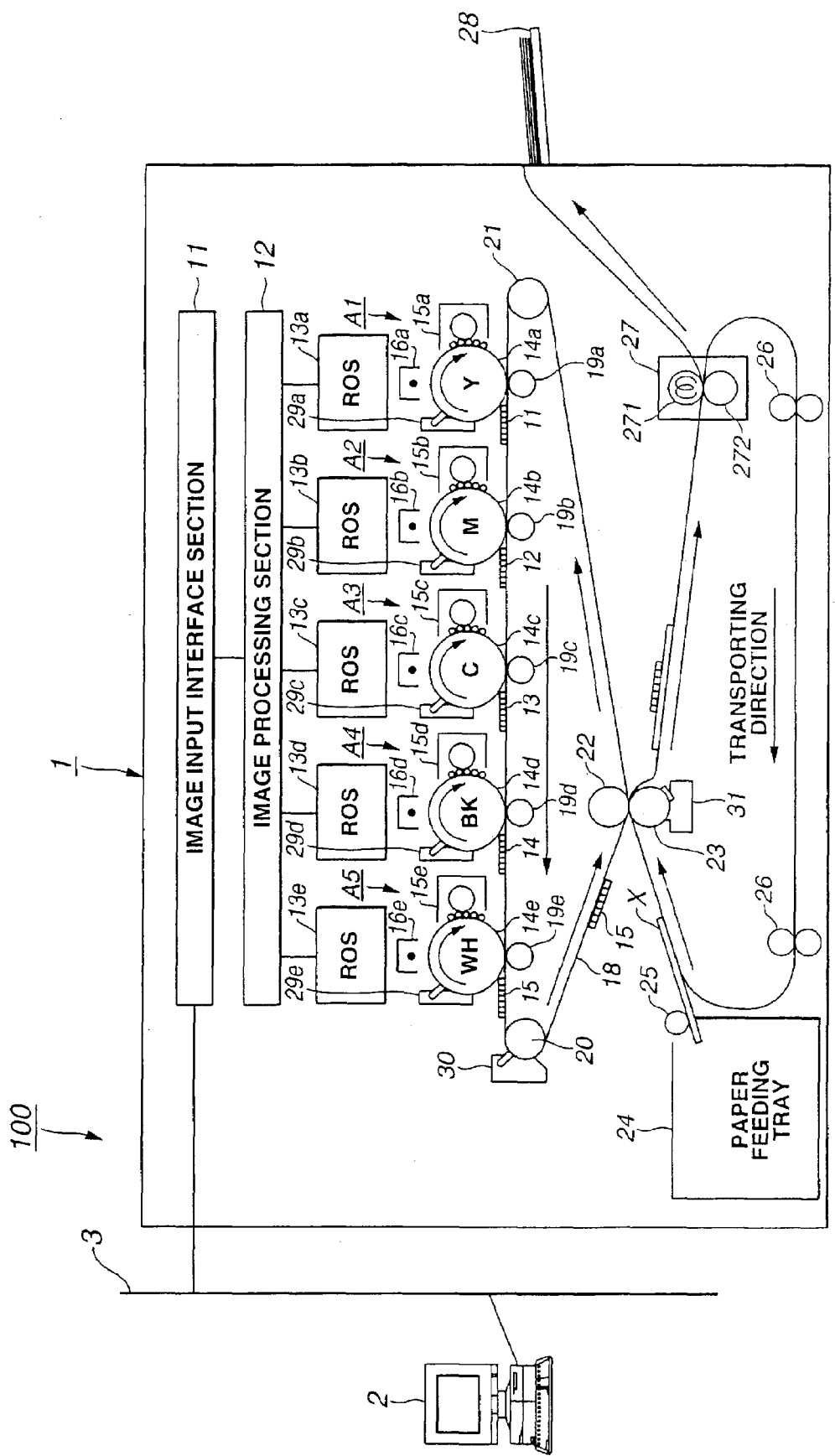
FIG. 1 is a diagram showing a structure example of an image formation system provided with a tandem-type color printer as an image formation processing apparatus according to an embodiment of the present invention.

FIG. 1 is a diagram showing a structure example of an image formation system 100 provided with a tandem-type color printer as an image formation processing apparatus according to an embodiment of the present invention.

As shown in FIG. 1, the image formation system 100 is comprised of a color printer 1 and a client terminal 2 which are connected to a computer network 3.

Here, the color printer 1 produces a three-dimensional print according to original image data and printing instructions being sent from the client terminal 2. Specifically, a raised portion is formed on a recording sheet with a thermal expandable toner containing at least a binder resin and an expandable agent according to the original image data, and an image to be raised is formed with a non-expandable color toner on the formed raised portion to produce a three-dimensional print which gives a three-dimensional appearance to the image to be raised.

More specifically, this color printer 1 inputs the original image data being sent from the client terminal 2 to an image processing section 12 through an image input interface section 11. And, the image processing section 12 performs image processing, such as Lab color space conversion processing, color correction processing, gradation correction processing or output signal synthesis processing, of the input image data.

And, the image data which is undergone the prescribed image processing by the image processing section 12 as described above is sent as four-color color material gradation data of yellow (Y), magenta (M), cyan (C) and black (BK) for the non-expandable color toner and color material gradation data of white (WH) for the thermal expandable toner to laser scanning optical devices (ROS: Raster Output Scanner) (hereinafter simply referred to as the "ROS") 13a to 13e corresponding to the respective colors. And, the ROS 13a to 13e performs image exposure by a laser beam according to the color material gradation data.

The color printer 1 has therein multiple image formation units A1 to A5 which can form multiple toner images with different colors. The respective image formation units A1 to A5 are mainly comprised of the ROS 13a to 13e as the image exposure units, photosensitive drums 14a to 14e as image carriers on which an electrostatic latent image is formed, and developing devices 15a to 15e which can form multiple toner images having different colors by developing the electrostatic latent images formed on the respective photosensitive drums 14a to 14e.

And, the ROS 13a to 13e modulate an unshown semiconductor laser according to original reproduction color material gradation data and emit a laser beam LB from the semiconductor laser according to the gradation data. The laser beam LB emitted from the semiconductor laser is deflected for scanning by an unshown rotating polygon mirror and applied to the photosensitive drum 14 used as the image carrier via an unshown f·θ lens and reflector for scanning and exposure.

And, the photosensitive drums 14a to 14e which are exposed to and scanned by the laser beam LB by means of the ROS 13a to 13e are driven to rotate at a give speed in an arrow direction by an unshown drive unit. The surfaces of the photosensitive drums 14a to 14e are previously charged to a given polarity (e.g., negative polarity) and a potential by primary charging scorotron chargers 16a to 16e and scanned by and exposed to the laser beam LB according to the color material gradation data to form electrostatic latent images. The surfaces of the photosensitive drums 14a to 14e are uniformly charged to, for example, −650V, the image portions are scanned by and exposed to the laser beam LB, and electrostatic latent images are formed with the exposed portions of −200V. The electrostatic latent images formed on the photosensitive drums 14a to 14e are reverse-developed with, for example, toner (charged color materials) charged to the negative polarity which is the same polarity as the charged polarities of the photosensitive drums 14a to 14e by the developing device 15a for four colors of the non-expandable color toners of yellow (Y), magenta (M), cyan (C) and black (BK) and the developing devices 15b to 15e for white of the thermal expandable toner of white (WH) so to form prescribed colored toner images T. At this time, a development bias voltage of, for example, −500V is applied to the developing rolls of the respective developing device 15a to 15e. The toner images T formed on the photosensitive drums 14a to 14e are negatively charged to adjust the amount of electric charge by an unshown pre-transfer charger, if necessary.

The respective color toner images formed on the photosensitive drums 14a to 14e are multi-transferred onto an intermediate transfer belt 18 which is disposed as an intermediate transfer unit below the photosensitive drums 14a to 14e by primary transfer rolls 19a to 19e as first transfer units. The intermediate transfer belt 18 is supported to be rotatable in an arrow direction at the same moving speed as the peripheral speeds of the photosensitive drums 14a to 14e by, for example, a drive roll 20, a driven roll 21 and a tension roll 22.

A toner image of all or a part of four colors, yellow (Y), magenta (M), cyan (C) and black (BK) to be formed on the photosensitive drums 14a to 14e and a thermal expandable toner (white) image are formed in a state sequentially superimposed by the primary transfer rolls 19 on the intermediate transfer belt 18 according to the colors of the image to be formed. In this case, the color toners are multi-transferred in order of yellow (Y), magenta (M), cyan (C) and black (BK) onto the intermediate transfer belt 18, and the thermal expandable toner of white (WH) is lastly multi-transferred.

And, the toner images T transferred onto the intermediate transfer belt 18 are transferred onto a recording sheet X which is carried as a recording medium to a secondary transfer position or the position of a secondary transfer roll 23 in prescribed timing by pressure-contact force and electrostatic attraction of the tension roll 22 which supports the intermediate transfer belt 18 and the secondary transfer roll 23 which configures a part of the second transfer unit which is forced to contact to the tension roll 22.

The recording sheet X having a prescribed size is fed from a paper-feeding tray 24 which is a member for accommodating multiple recording mediums by a feed roll 25. And, the fed recording sheet X is transported to the secondary transfer position of the intermediate transfer belt 18, namely the position of the secondary transfer roll, by multiple transfer rolls 26 in prescribed timing.

And, the toner images having prescribed colors are collectively transferred from the intermediate transfer belt 18 onto the recording sheet X by the tension roll 22 as the secondary transfer unit and the secondary transfer roll 23 as described above.

The recording sheet X onto which the toner images having the prescribed colors are transferred from the intermediate transfer belt 18 is separated from the intermediate transfer belt 18 and transported to a fixing section 27. The toner images are fixed onto the recording sheet X by heating and pressing by means of a heating roll 271 and a pressure roll 272 in the fixing section 27. Then, the recording sheet X is discharged to a discharge tray 28 which is on the outside of the color printer 1, and the process of forming the three-dimensional color image is terminated. Specifically, a thermal fixing processing is performed on the recording sheet onto which the toner image of the thermal expandable toner and the color toner image of a non-expandable color toner are transferred by the fixing section 27 to expand the thermal expandable toner on the recording sheet to form the three-dimensional image and also to fusion-fix the color toner image of the non-expandable color toner on the same recording sheet.

Cleaning devices 29a to 29e provided for the respective image formation units A1 to A5 remove the residual toner, paper dust, and the like from the surfaces of the photosensitive drums 14a to 14e after the transfer process is terminated. And, a cleaner 30 which is disposed near the intermediate transfer belt 18 cleans the intermediate transfer belt 18. Besides, a cleaner 31 which is disposed near the secondary transfer roll 23 cleans the secondary transfer roll 23.

The intermediate transfer belt cleaner 30 and the secondary transfer roll cleaner 31 are configured to contact or separate from the intermediate transfer belt 18 in prescribed timing.

The embodiment described above is configured to have the four-color non-expandable color toners of yellow (Y), magenta (M), cyan (C) and black (BK) and the thermal expandable toner of white (H) in the image formation units A1 to A5. In addition, it may be configured to have three-color non-expandable color toners of yellow (Y), magenta (M) and cyan (C) and the thermal expandable toner of white (H).

In this embodiment, the color printer 1 and the client terminal which are connected to the computer network 3 each are single, but they may be connected in plural, and dispersion printing may be made in such a configuration.

As the expandable toner used in this embodiment, one described in, for example, "Embodiments of the Invention" in Japanese Patent Laid-Open Publication No. 2001-134006 may be used.

Then, a specific method of forming a three-dimensional print having a visually enhanced three-dimensional appearance by combining a coloring technique with the raised image portion formed of the thermal expandable toner by the color printer configured as described above will be described. It is to be understood that the processing to be described below is performed by the image processing section 12 of the color printer 1 shown in FIG. 1 when a user previously makes various setting by using a three-dimensional print setting UI screen of FIG. 12, FIG. 13A to FIG. 13C to be described later.

(1)-1: First, a case of not placing a color on the contour portion of a raised image portion formed with the expandable toner will be described with reference to FIG. 2, FIG. 3A and FIG. 3B.

Figure 2:
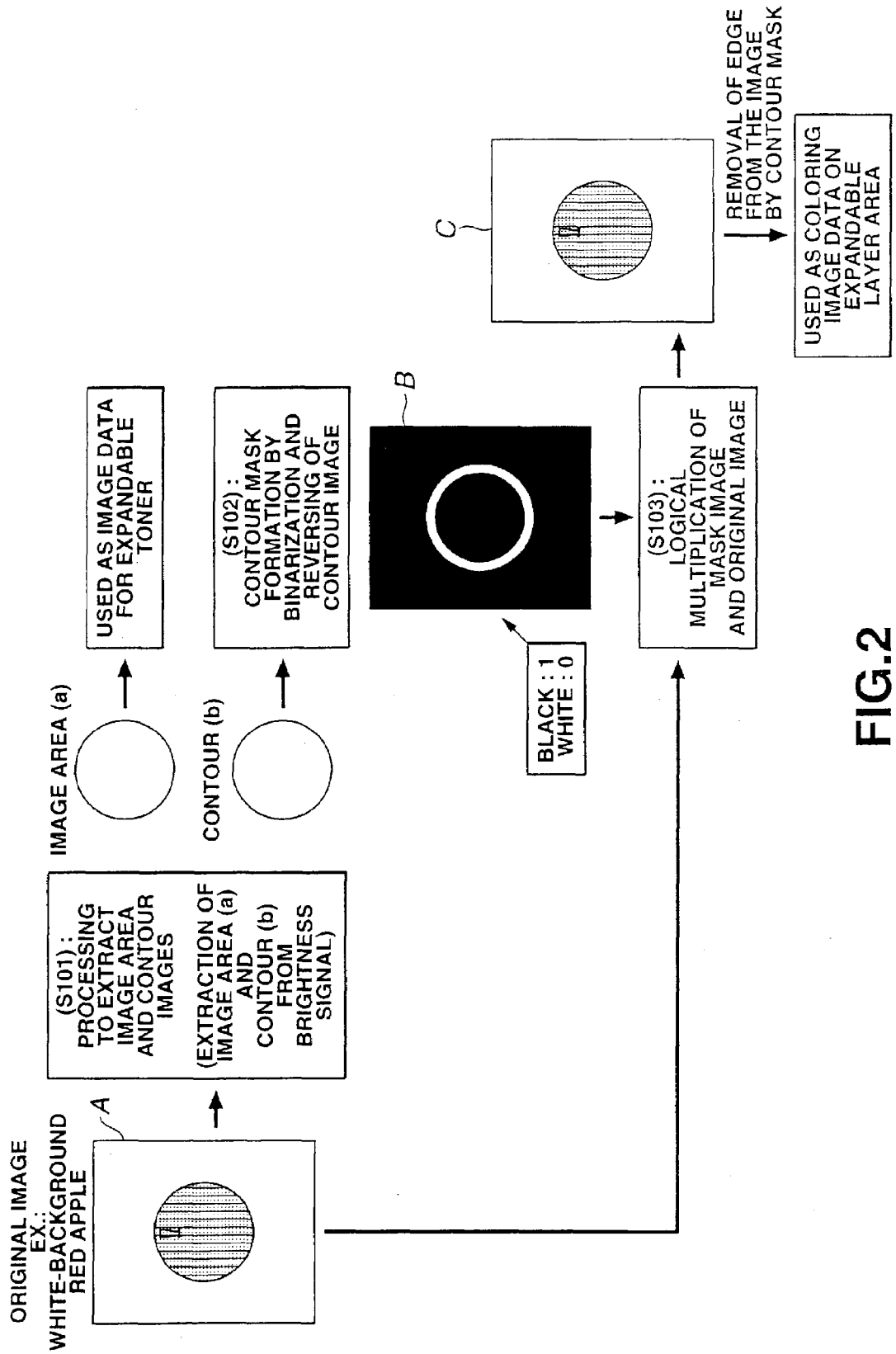
FIG. 2 is a flow chart showing a processing operation in that color is not placed on the contour portion of a raised image portion formed with an expandable toner in an image processing section of the color printer shown in FIG. 1.

FIG. 2 is a flow chart showing a processing operation when a color is not placed on the contour portion of the raised image portion formed with the expandable toner by the image processing section 12 of the color printer shown in FIG. 1.

In FIG. 2, when an original image A (an image of a red apple against a white background in this case) is input to the image processing section 12 from the client terminal 2 through the image input interface section 11, an image (a) of the image area and a contour image (b) are extracted from a brightness signal of the input original image A (S101).

Then, the image processing section 12 uses the image (a) of the image area as image data for an expandable toner (white) which forms a raised portion. In other words, the image processing section 12 instructs the image formation unit A5 for the expandable toner shown in FIG. 1 to form the raised image portion according to the image data (a).

On the other hand, the image processing section 12 forms a contour mask from the contour image (b) (step S102). Specifically, the contour image (b) is binarized, and reverse processing is performed to produce a contour mask image B.

Then, the image processing section 12 performs logical multiplication of the contour mask image B produced in the step S102 and the original image A (step S103). In other words, the logical multiplication here compares the original image A and the contour mask image B, places the color of the original image on a part having black: "1" of the contour mask image B and does not place the color of the original image on a part having white: "0" of the contour mask image B or masks it.

Thus, coloring image data C of an expandable layer area is produced. In other words, this image data has contour portion of the original image to be raised is removed by the contour mask. Specifically, in this embodiment, the image processing section 12 instructs the image formation to the image formation units A to A4 shown in FIG. 1 according to the coloring image data C of the expandable layer area, and the "white-background red apple" image as the original image is printed as an image having the contour portion of the red apple removed on the a raised portion formed on the recording sheet.

Figure 3A:
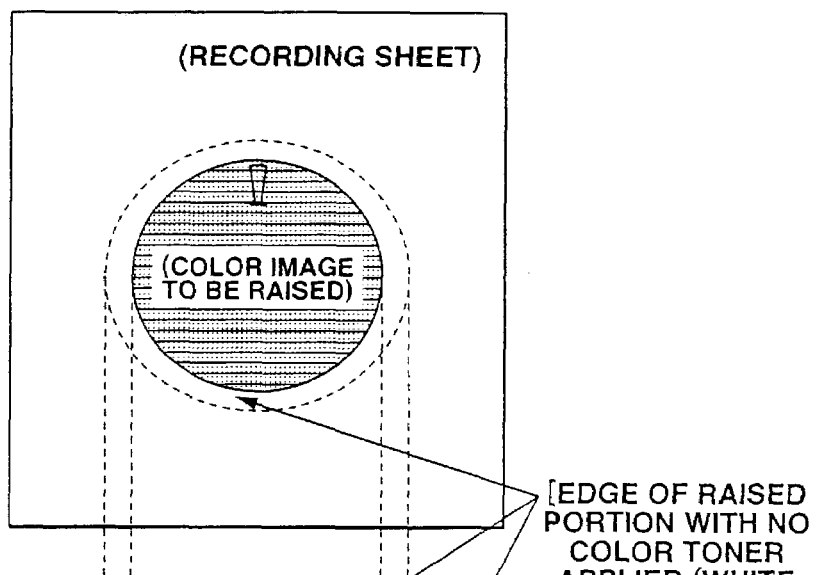
FIG. 3A and FIG. 3B are diagrams showing a formed image of an image to be raised which is formed on a recording sheet by performing the flow of contour processing shown in FIG. 2.
Figure 3B:
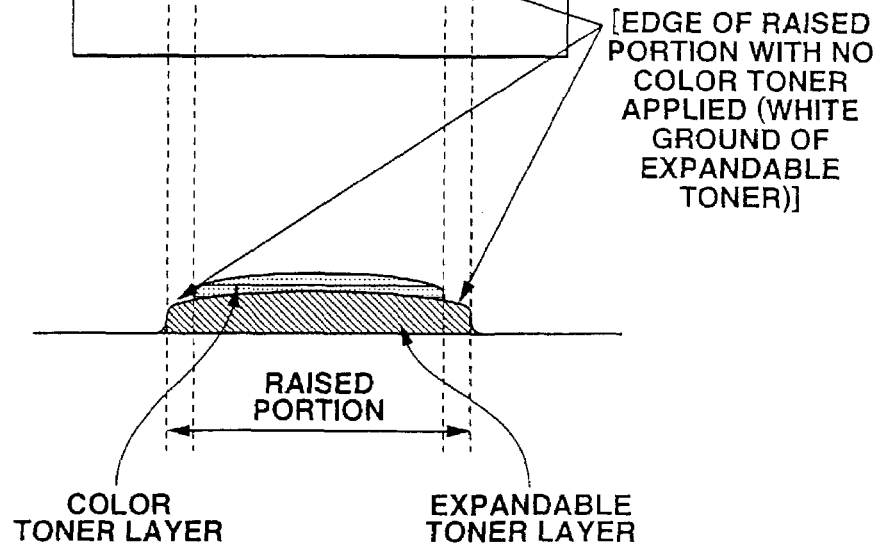

FIG. 3A and FIG. 3B are diagrams showing a formed image of an image to be raised which is to be formed on the recording sheet by performing the flow contour processing shown in FIG. 2. FIG. 3A shows a formed image of the image to be raised formed on the recording sheet viewed from the upper side of the sheet on which the image to be raised is printed, and FIG. 3B shows a sectional image of the image portion to be raised viewed from the side of the recording sheet shown in FIG. 3A.

As shown in FIG. 3A and FIG. 3B, this embodiment does not form the color image to be raised in conformity with a size of the raised portion formed with the expandable toner on the recording sheet but makes the white ground of the expandable toner visible without placing a color toner on the contour portion of the original image to be raised.

Thus, it becomes possible to form a three-dimensional print having a visually enhanced three-dimensional appearance as compared with the prior art.

(1)-2: Then, coloring of the contour portion of the raised image portion, which is formed with the expandable toner, with a color having a large brightness difference from the color of the image to be raised or a complementary color (an opposite color in brightness) of the image to be raised will be described with reference to FIG. 4, FIG. 5A and FIG. 5B.

Figure 4:
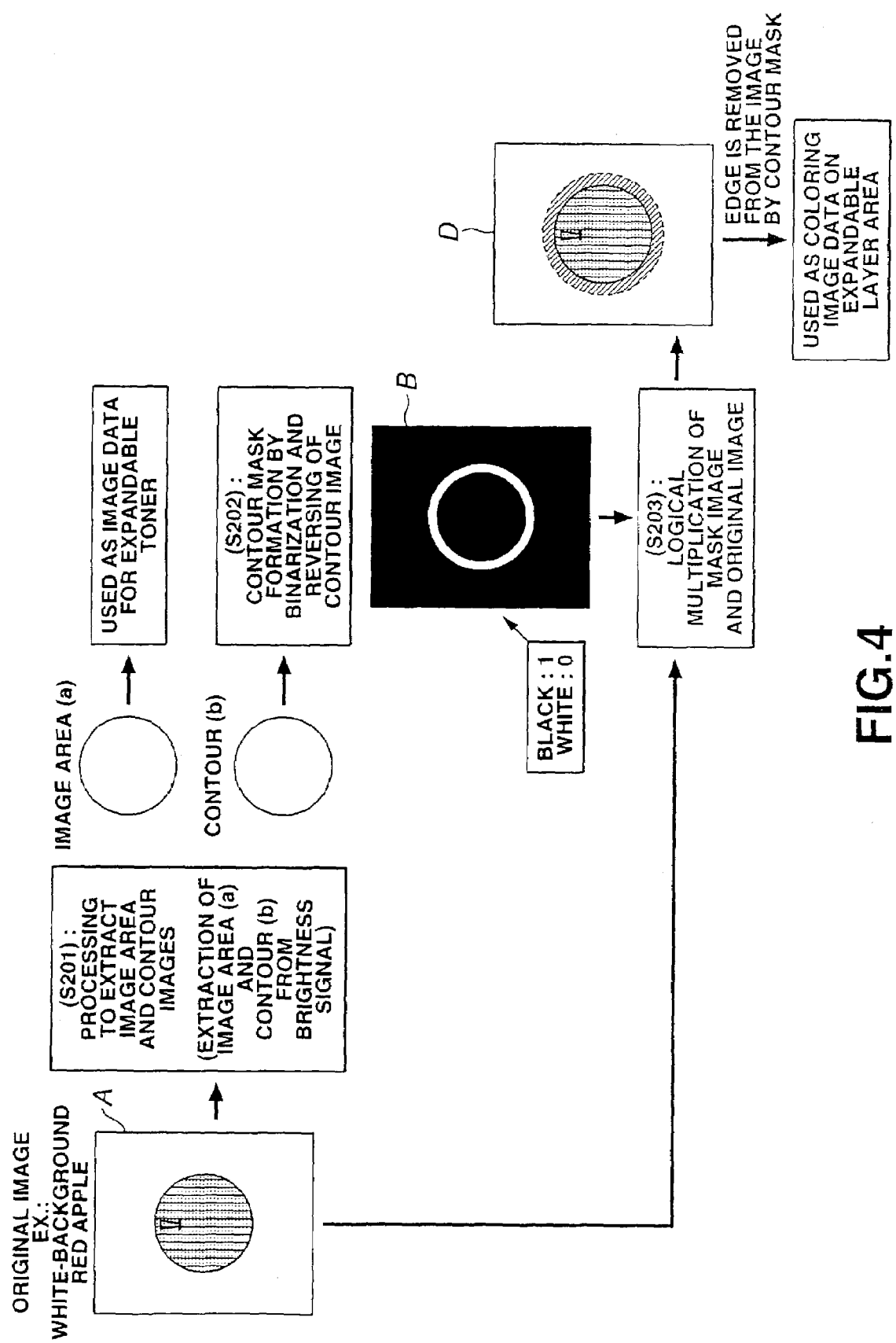
FIG. 4 is a flow chart showing a processing operation procedure for coloring the contour portion of the raised image portion formed with an expandable toner in the image processing section of the color printer shown in FIG. 1 with a color having a large brightness difference from the color of the image to be raised or with a complementary color to the color of the image to be raised.

FIG. 4 is a flow chart showing a processing operation procedure to color the contour portion of the raised image portion, which is formed with the expandable toner by the image processing section 12 of the color printer shown in FIG. 1, with a color having a large brightness difference from the color of the image to be raised or a complementary color to the color of the image to be raised.

In FIG. 4, when the original image A is input to the image processing section 12 from the client terminal 2 through the image input interface section 11, an image area (a) and a contour (b) are extracted from the brightness signal of the input original image A (step S201).

Then, the image processing section 12 uses the image area (a) information as image data for the expandable toner (white) to form the raised portion. In other words, the image processing section 12 instructs the formation of the raised image portion to the image formation unit A5 for the expandable toner shown in FIG. 1 according to the image data (a).

The image processing section 12 produces a contour mask from the contour (b) information. Specifically, the contour (b) image is binarized, and reverse processing is performed (S202) to form the contour mask image B.

Then, the image processing section 12 performs logical multiplication of the original image A and the contour mask image B produced in the step of S202 (step S203).

Specifically, the logical multiplication here compares the original image A and the contour mask image B, places the color of the original image on a part having black: "1" of the contour mask image B and places a color having a large brightness difference from the color of the image to be raised or a complementary color (e.g., yellow, green, gray or the like) to the color of the image to be raised on a part having white: "0" of the contour mask image B according to a predetermined color information table.

Thus, coloring image data D of the expandable layer area is produced. In other words, the image data is used to place a color to provide a large brightness difference from the color of the image to be raised or a complementary color (e.g., yellow, green, gray or the like) of the color of the image to be raised on the contour portion of the image to be raised by the contour mask. Specifically, in this embodiment, the image processing section 12 instructs the image formation to the image formation units A to A4 shown in FIG. 1 according to the coloring image data D of the expandable layer area, and the "white-background red apple" image as the original image is printed as an image, which has the color providing the brightness difference or the complementary color colored on the contour portion of the red apple, on the raised portion formed on the recording sheet.

Figure 5A:
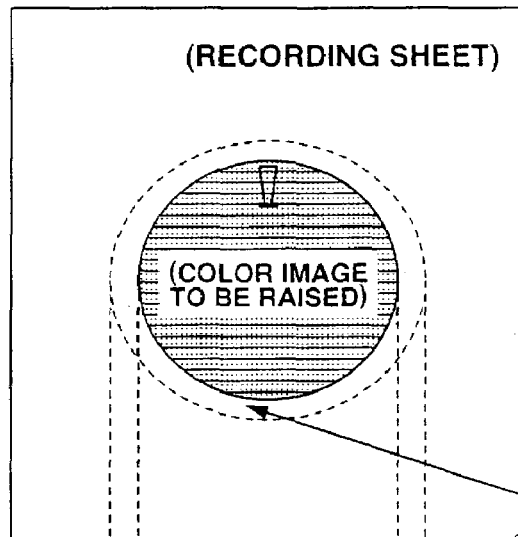
FIG. 5A and FIG. 5B are diagrams showing a formed image of an image to be raised which is to be formed on a sheet by performing the flow of contour processing shown in FIG. 4.
Figure 5B:
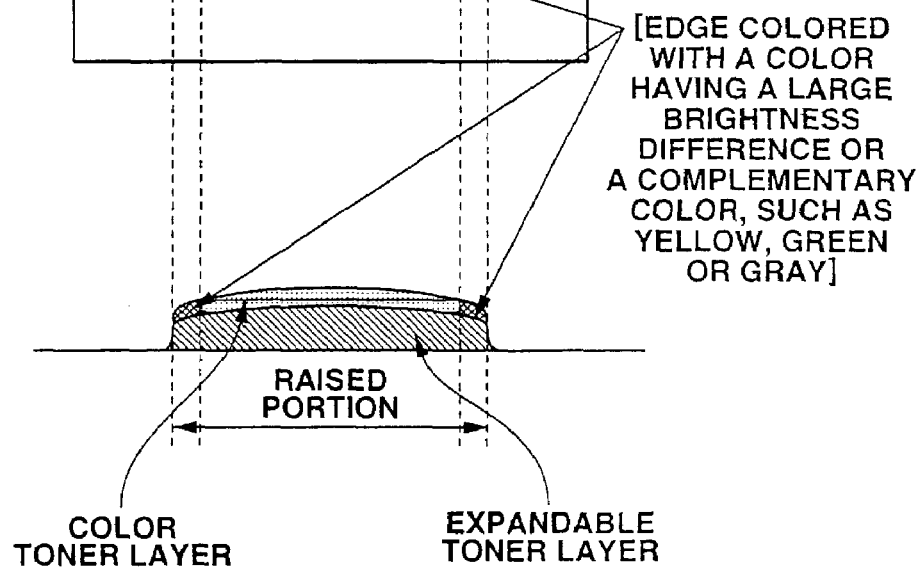

FIG. 5A and FIG. 5B are diagrams showing a formed image of the image to be raised which is to be formed on a sheet by performing the flow of contour processing shown in FIG. 4. FIG. 5A shows a formed image of the image to be raised formed on the sheet viewed from the upper side of the sheet on which the image to be raised is printed, and FIG. 5B shows a sectional image of the image portion to be raised viewed from the side of the sheet shown in FIG. 5A.

As shown in FIG. 5A and FIG. 5B, this embodiment does not form the color image to be raised as it is in conformity with a size of the a raised portion formed with the expandable toner on the recording sheet but places a color having a large brightness difference from the color of the image to be raised or a complementary color (e.g., yellow, green, gray or the like) of the color of the image to be raised without placing the original color toner on the contour portion of the original image to be raised.

Thus, it becomes possible to form a three-dimensional print having a visually enhanced three-dimensional appearance as compared with the prior art.

(2) The formation of a frame on the outside of the raised image portion formed with the expandable toner with a color having a large brightness difference from the color of the image to be raised or a complementary color corresponding to the color of the image to be raised will be described with reference to FIG. 6, FIG. 7A and FIG. 7B.

Figure 6:
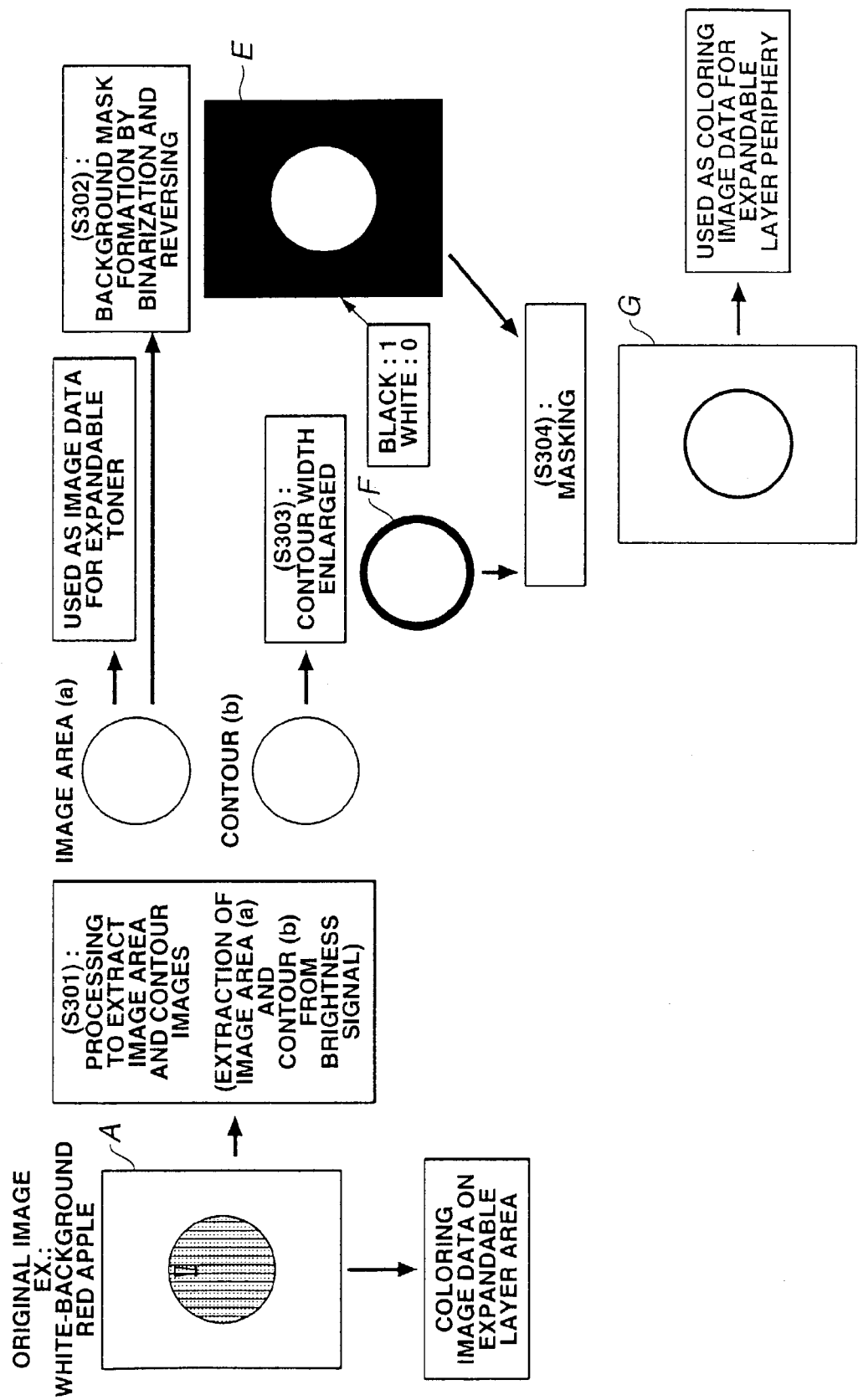
FIG. 6 is a flow chart showing a processing operation procedure to form a frame on the outside of the raised image portion formed with an expandable toner in the image processing section of the color printer shown in FIG. 1 with a color having a large brightness difference from the color of the image to be raised or with a complementary color corresponding to the color of the image to be raised.

FIG. 6 is a flow chart showing a processing operation procedure to form a frame on the outside of the raised image portion formed with the expandable toner by the image processing section 12 of the color printer shown in FIG. 1 with a color having a large brightness difference from the color of the image to be raised or a complementary color corresponding to the color of image to be raised.

In FIG. 6, when the original image A is input from the client terminal 2 through the image input interface section 11, the image processing section 12 extracts the image (a) of the image area and the contour image (b) from the brightness signal of the input original image A (S301).

Then, the image processing section 12 uses the image area (a) information as image data for an expandable toner (white) to form the raised portion. In other words, the image processing section 12 instructs the formation of the raised image portion to the image formation unit A5 for the expandable toner shown in FIG. 1 according to the image data (a).

And, the image processing section 12 produces a background mask from the image (a) information of the image area (S302). Specifically, binarization processing and reverse processing are performed to form a background mask image E.

And, the image processing section 12 processes to enlarge a width of the contour from the contour image (b) (step S303). Thus, a contour width enlarged image F is produced.

Then, the image processing section 12 performs masking by using the formed background mask image E and contour width enlarged image F (step S304). Specifically, this masking process compares the background mask image E and the contour width enlarged image F, removes the contour portion of the contour width enlarged image F on a part having white: "0" of the background mask image E, remains the contour portion of the contour width image F on a part having black: "1" and, according to the predetermined color information table, places a color having a large brightness difference from the color of the image to be raised or a complementary color (e.g., yellow, green, gray or the like) to the color of the image to be raised.

Thus, image data G on the expandable layer periphery is produced. In other words, this image data is used to form a frame on the outside of the contour of the image to be raised with a color having a large brightness difference from the color of the image to be raised or a complementary color corresponding to the color of the image to be raised. In other words, in this embodiment, the image processing section 12 instructs the image formation to the image formation units A to A4 shown in FIG. 1 based on the coloring mage data G on the expandable layer area. And, the "white-background red apple" image as the original image is printed on the raised portion formed on the recording sheet as an image having a color producing the above-described brightness difference or a complementary color on the outside portion of the contour of the red apple.

The image processing section 12 uses the original image as it is as the coloring image data on the expandable layer area.

Figure 7A:
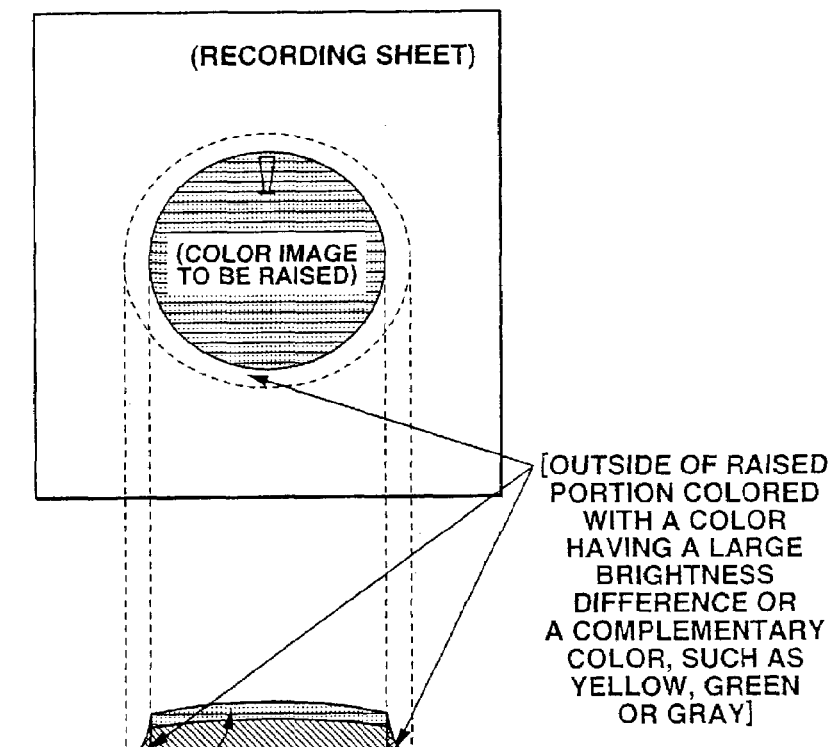
FIG. 7A and FIG. 7B are diagrams showing a formed image of an image to be raised which is to be formed on a sheet by performing the flow of peripheral frame forming image processing shown in FIG. 6.
Figure 7B:
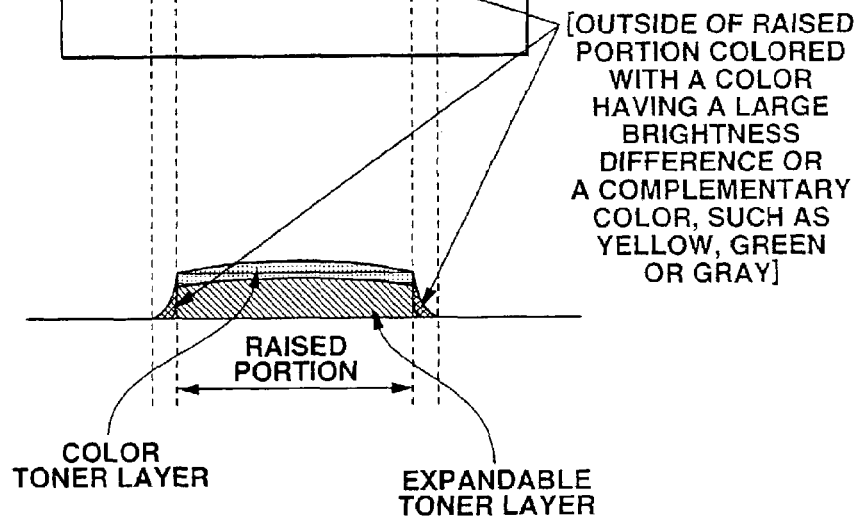

FIG. 7A and FIG. 7B are diagrams showing a formed image of a image to be raised which is to be formed on a sheet by performing the flow of peripheral frame forming image processing shown in FIG. 6. FIG. 7A shows a formed image of the image to be raised formed on the sheet viewed from the upper side of the sheet on which the image to be raised is printed, and FIG. 7B shows a sectional image of the image portion to be raised viewed from the side of the sheet shown in FIG. 7A.

As shown in FIG. 7A and FIG. 7B, this embodiment does not form the color image to be raised as it is in conformity with a size of the raised portion formed with the expandable toner on the recording sheet but places a color having a large brightness difference from the color of the image to be raised or a complementary color (e.g., yellow, green, gray or the like) of the color of the image to be raised on the outside portion of the contour of the original image to be raised.

Thus, it becomes possible to produce a three-dimensional print having a visually enhanced three-dimensional appearance as compared with the prior art.

(3) The formation of a frame which forms a shadow of the image to be raised on the outside of the raised image portion formed with the expandable toner will be described with reference to FIG. 8, FIG. 9A and FIG. 9B.

Figure 8:
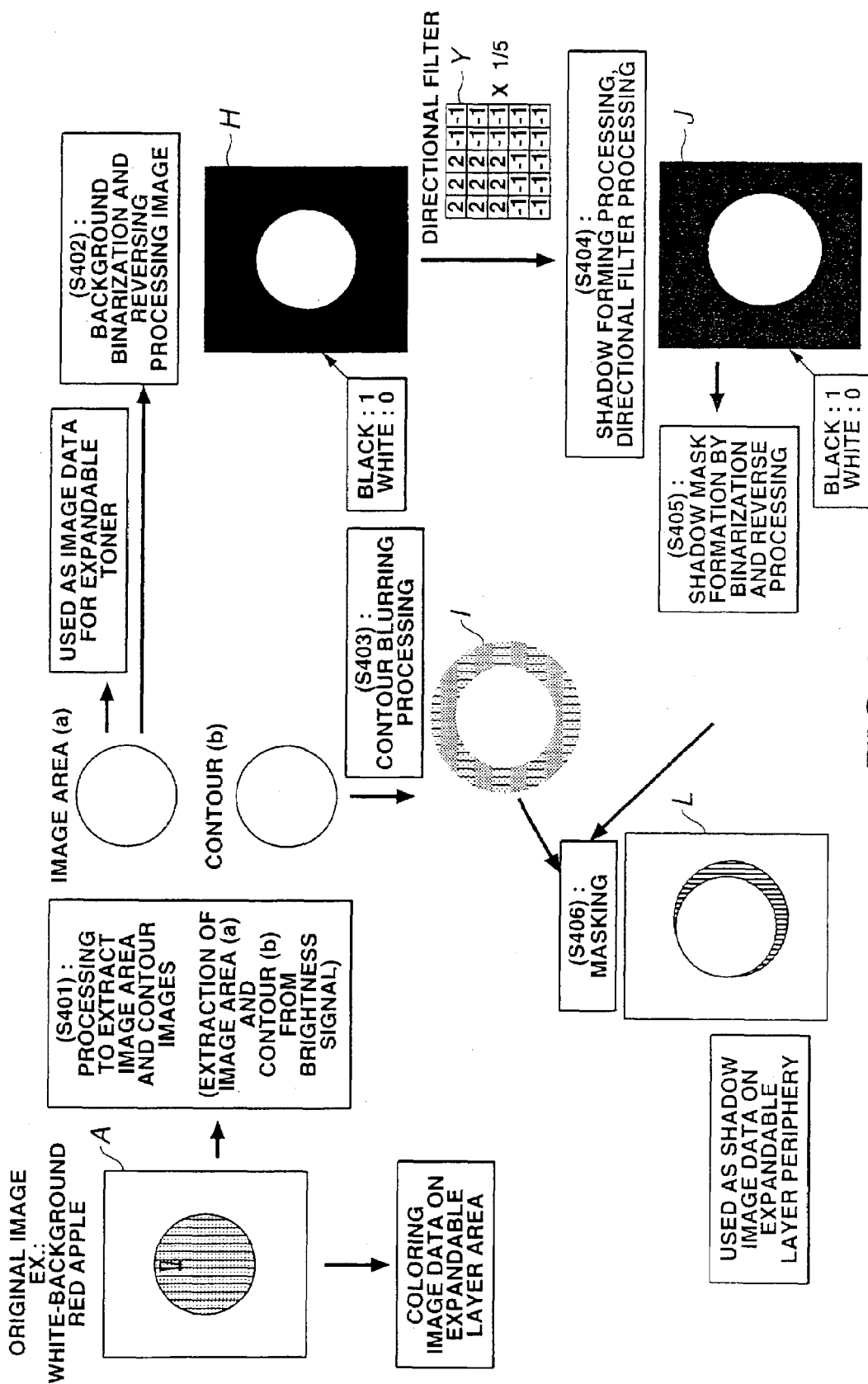
FIG. 8 is a flow chart showing a processing operation procedure to form a frame, which forms a shadow of the image to be raised, on the outside of the raised image portion formed with an expandable toner in the image processing section of the color printer shown in FIG. 1.

FIG. 8 is a flow chart showing processing operation procedure to form a frame which forms a shadow of the image to be raised on the outside of the raised image portion formed with the expandable toner by the image processing section 12 of the color printer shown in FIG. 1.

In FIG. 8, when the original image A is input from the client terminal 2 through the image input interface section 11, the image processing section 12 extracts the image area (a) and the contour (b) from the brightness signal of the input original image A (step S401).

Then, the image processing section 12 uses the image area (a) information as image data for the expandable toner (white) to form the raised portion. In other words, the image processing section 12 instructs the formation of the raised image portion to the image formation unit A5 for the expandable toner shown in FIG. 1 according to the image data (a).

The image processing section 12 performs background binarization processing and reverse processing from the original image A (step S402) to form a background binarization/reverse image H.

Then, the image processing section 12 performs contour image blurring processing on the contour (b) image extracted in the step S401 (step S403) to form a contour blurry image H.

And, the image processing section 12 performs a shadow forming processing from the background binarization/reverse image H formed in the step S402 (step S404). Specifically, the shadow of the image area (a) is formed by using a directional filter (Y) shown in FIG. 8, and a shadow image J is formed.

Subsequently, the image processing section 12 processes to form a shadow mask image K from the formed shadow image J (step S405). Specifically, the shadow mask image K is formed by binarization and reverse processing of the shadow image J.

Then, the image processing section 12 uses the contour blurry image I formed by the processing in the step S403 and the shadow mask image K formed by the processing in the step S405 to perform masking (step S406). Specifically, this masking process compares the contour blurry image I and the shadow mask image K, shows a color of the contour blurry image I on a part having black: "1" of the shadow mask image K but does not place a color on a part having white: "0" of the shadow mask image K.

Thus, shadow image data L on the expandable layer periphery is formed. In other words, this image data is used to form a shadow on the image to be raised. In this embodiment, the image processing section 12 instructs the image formation to the image formation units A to A4 shown in FIG. 1 according to the shadow image data L on the expandable layer periphery, and the "white-background red apple" image as the original image is printed on the raised portion formed on the recording sheet as an image having a shadow on the outside section of the contour of the red apple.

Figure 9A:
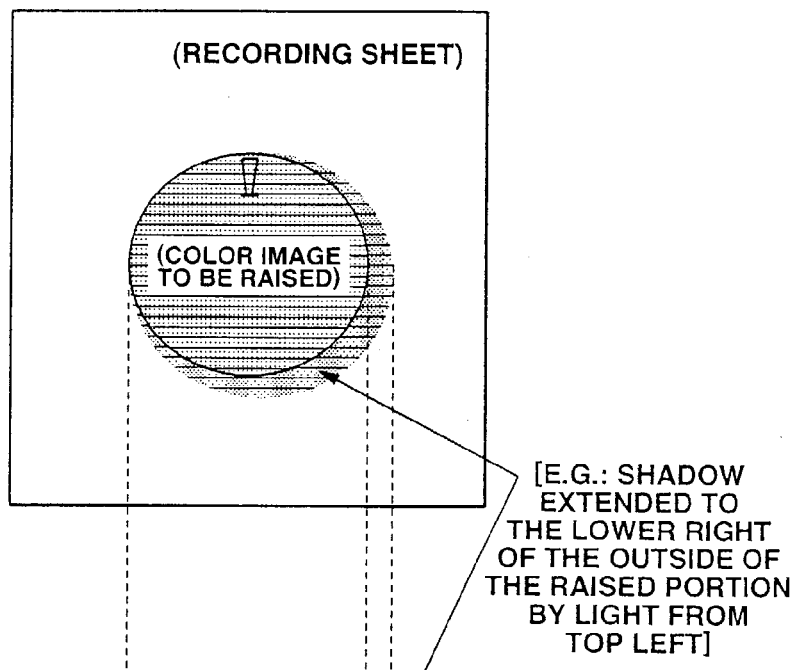
FIG. 9A and FIG. 9B are diagrams showing a formed image of an image to be raised which is to be formed on a sheet by performing the flow of shadow image processing shown in FIG. 8.
Figure 9B:
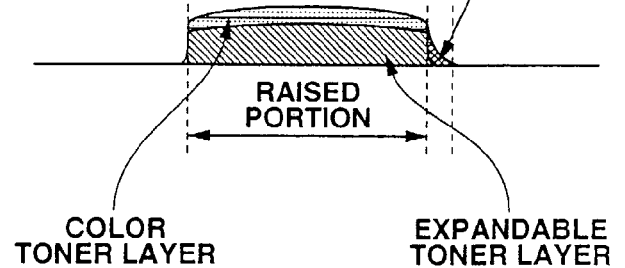

FIG. 9A and FIG. 9B are diagrams showing a formed image of the image to be raised which is to be formed on a sheet by performing the flow of shadow image processing shown in FIG. 9. FIG. 9A shows the formed image of the image to be raised on the sheet viewed from the upper side of the sheet on which the image to be raised is printed, and FIG. 9B shows a sectional image of the image portion to be raised viewed from the side of the sheet shown in FIG. 9A.

As shown in FIG. 9A and FIG. 9B, this embodiment does not form the color image to be raised as it is in conformity with the size of the raised portion formed with the expandable toner on the recording sheet but colors a color, which forms a shadow of the image to be raised, on the outside section of the contour of the original image to be raised.

Thus, it becomes possible to form a three-dimensional print having a visually enhanced three-dimensional appearance as compared with the prior art.

(4) The application of gradation to the outside of the raised image portion formed with the expandable toner will be described with reference to FIG. 10, FIG. 11A and FIG. 11B.

Figure 10:
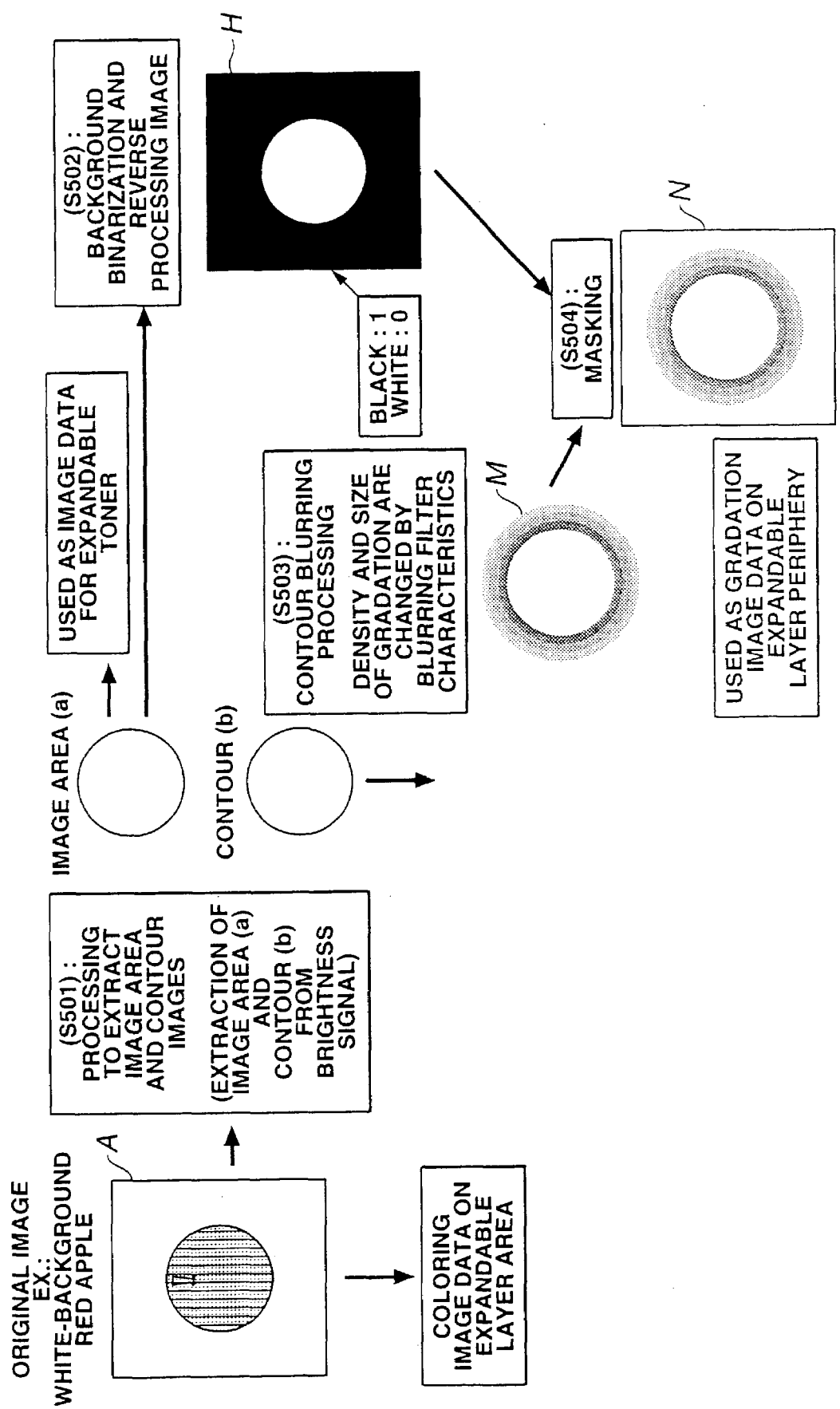
FIG. 10 is a flow chart showing a processing operation procedure to apply gradations to the outside of the raised image portion formed with an expandable toner in the image processing section of the color printer shown in FIG. 1.

FIG. 10 is a flow chart showing a processing operation procedure when gradation is applied to the outside of the raised image portion formed with the expandable toner in the image processing section 12 of the color printer shown in FIG. 1.

In FIG. 10, when the original image A is input from the client terminal 2 through the image input interface section 11, the image processing section 12 extracts the image area (a) and the contour (b) from the brightness signal of the input original image A (step S501).

Then, the image processing section 12 uses the image area (a) information as image data for the expandable toner (white) to form the raised portion. In other words, the image processing section 12 instructs the formation of the raised image portion to the image formation unit A5 for the expandable toner shown in FIG. 1 according to the image data (a).

The image processing section 12 performs background binarization processing and reverse processing from the original image A (step S502) to form a background binarization/reverse image H.

Then, the image processing section 12 performs blurring processing including gradation on the contour (b)image extracted by the processing in the step S901 (step S503) to form a gradation blurry image M.

Specifically, color information (e.g., gray if there is no background color) to make the base color intense toward the raised portion if the base color is light or color information to make the base color light toward the raised portion if the base color is intense is set in the gradation information table, and the gradation blurry image M is formed according to the above information. The gradation may be taken to any of brightness, chroma and hue axes, and the axis and direction of gradation may be selected according to the user preference.

Then, the image processing section 12 uses the background binarization/reverse image H formed by the processing in the step S502 and the gradation blurry image M formed by the processing in the step S503 to perform masking (step S504). Specifically, the background binarization/reverse image H and the gradation blurry image M are compared, and the color of the gradation blurry image is placed on a part having black: "1" of the background binarization/reverse image H, while the color of the gradation blurry image is not placed on a part having white: "0".

Thus, the gradation image data N on the expandable layer periphery is, produced. In other words, this image data is used to give a gradation background to the outside of the contour of the image to be raised. In other words, in this embodiment, the image processing section 12 instructs the image formation to the image formation units A to A4 shown in FIG. 1 according to the shadow image data L on the above expandable layer periphery to print the "white-background red apple" image as the original image on the raised portion formed on the recording sheet as an image having a color of gradations on the outside section of the contour of the red apple.

Figure 11A:
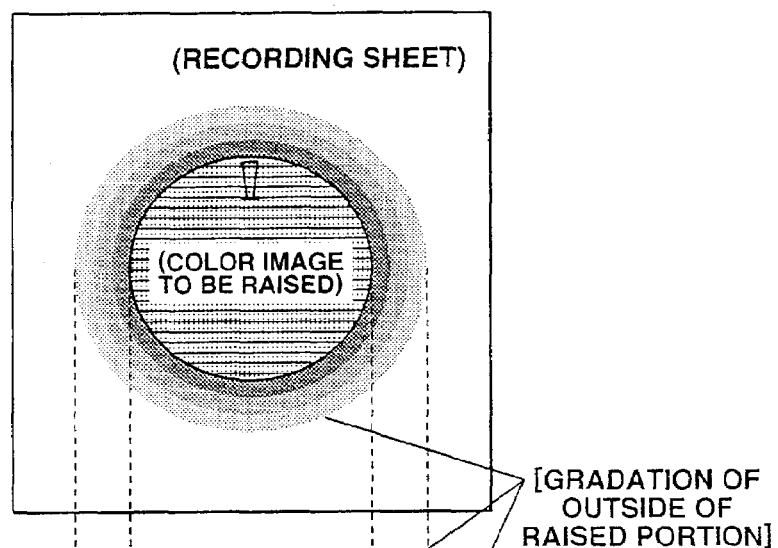
FIG. 11A and FIG. 11B are diagrams showing a formed image of an image to be raised which is to be formed on a sheet by performing the flow of peripheral gradation image processing shown in FIG. 10.
Figure 11B:
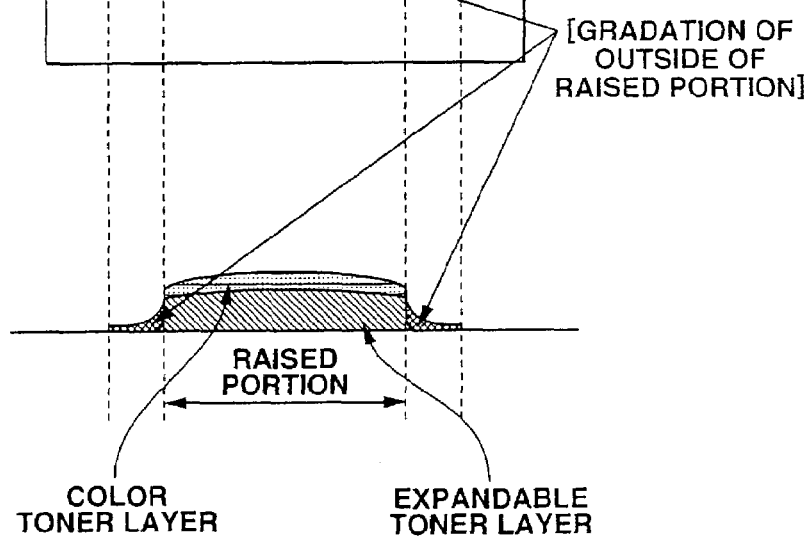

FIG. 11A and FIG. 11B are diagrams showing a formed image of the image to be raised which is to be formed on a sheet by performing the flow of peripheral gradation image processing shown in FIG. 10. FIG. 11A shows the formed image of the image to be raised which is formed on the sheet viewed from the upper side of the sheet on which the image to be raised is printed, and FIG. 11B shows a sectional image of the image portion to be raised viewed from the side of the sheet shown in FIG. 11A.

As shown in FIG. 11A and FIG. 11B, this embodiment does not form the color image to be raised as it is in conformity with the size of the raised portion formed with the expandable toner on the recording sheet but colors a color of gradation on the outside section of the contour of the original image to be raised.

Thus, it becomes possible to form a three-dimensional print having a visually enhanced three-dimensional appearance as compared with the prior art.

A configuration of the user interface (UI) image for a variety of setting of a three-dimensional print by the user before starting the processing described above will be described with reference to FIG. 12.

Figure 12:
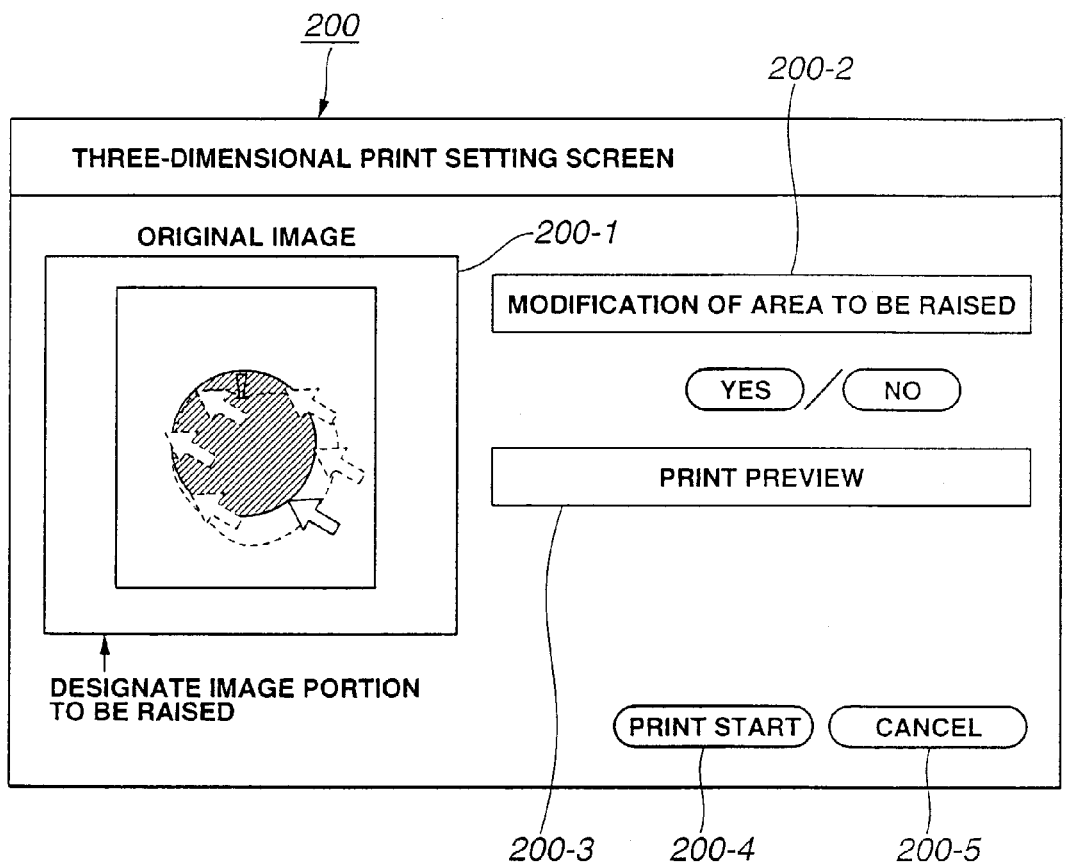
FIG. 12 is a diagram showing an example of a three-dimensional print setting UI screen of a printer driver in the client terminal shown in FIG. 1.

FIG. 12 is a diagram showing an example of the UI screen of a printer driver in the client terminal 2 shown in FIG. 1, and there is shown an example structure pf a three-dimensional print setting screen 200.

In FIG. 12, the three-dimensional print setting screen 200 is comprised of a raised image point designation column 200-1 used by the user to designate which part of the original image is raised, a "modification of processing area" item 200-2 used by the user to designate whether modification/change processing of the original image described in the above embodiments is performed, a "print preview" button 200-3 which is used to check the entire image to be actually printed before printing it, a "print start" button 200-4 which is used by the user to instruct the start of printing, and a "cancel" button 200-5 which is used by the user to cancel the setting on the screen.

Figure 13A:
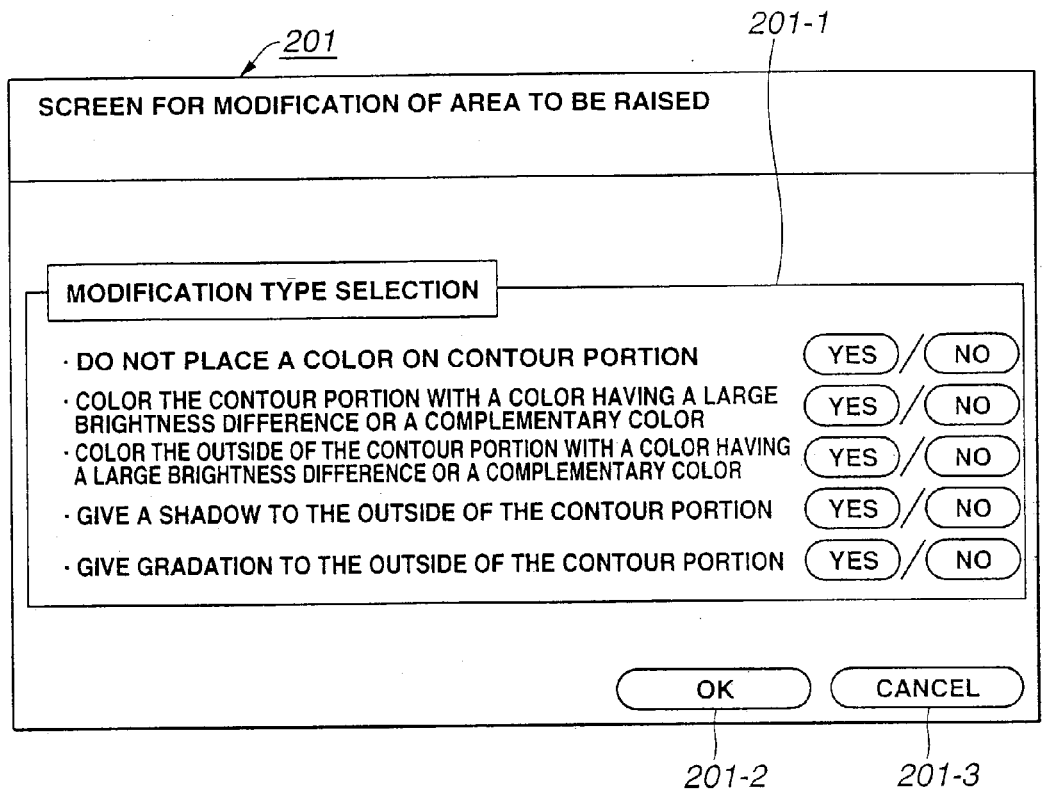
FIG. 13A to FIG. 13C are diagrams showing an example of a three-dimensional processing area modification UI screen of a printer driver in the client terminal shown in FIG. 1.
Figure 13B:
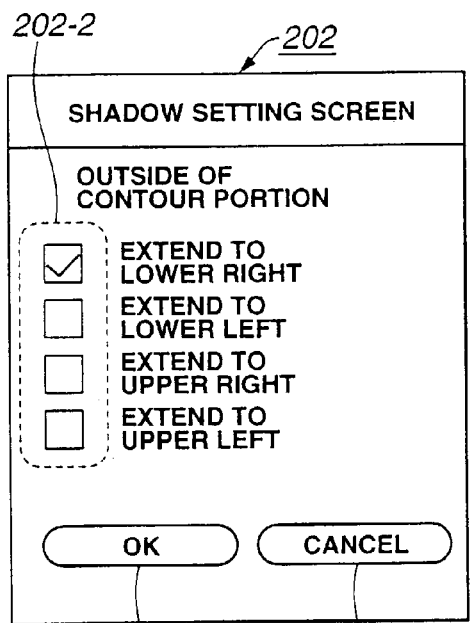
Figure 13C:
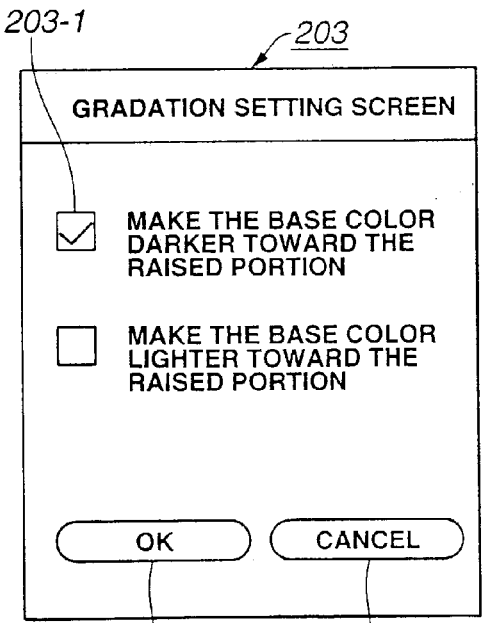

And, when the user designates "YES" in the "modification of processing area" item 200-2, the screen changes to a raising processing area modification screen 201 shown in FIG. 13A to FIG. 13C.

In FIG. 13A to FIG. 13C, the raising processing area modification screen 201 is comprised of a "modification type selection" item 201-1 for selection of a modification/change type, an "OK" button 201-2 used to determine setting on the screen 201, and a "cancel" button 201-3 used to cancel a setting on the screen 201.

Specifically, the modification type selection item 201-1 includes a type "Do not place a color on contour portion (YES/NO)" which is the modification processing shown in the embodiments and FIG. 2, FIG. 3A and FIG. 3B, a type "Color the contour portion with a color having a large brightness difference or a complementary color (YES/NO)" which is the modification processing shown in FIG. 4, FIG. 5A and FIG. 5B, a type "Color the outside of the contour portion with a color having a large brightness difference or a complementary color (YES/NO)" which is the modification processing shown in FIG. 6, FIG. 7A and FIG. 7B, a type "Give a shadow to the outside of the contour portion (YES/NO)" which is the modification processing shown in FIG. 8, FIG. 9A and FIG. 9B, and a type "Give gradation to the outside of the contour portion (YES/NO)" which is the modification processing shown in FIG. 10, FIG. 11A and FIG. 11B.

And, when the user selects "YES" in the "Give a shadow to the outside of the contour portion" among the above selection types, the screen changes to the shadow setting screen 201 shown in FIG. 13B. The user checks any of the shadow selection candidates in the designation check box 201-1 shown on the screen 201 to selectively designate a shadowing portion as desired.

And, when the user selects "YES" in the "Give gradation to the outside of the contour portion" among the above selection types, the screen changes to the display of the gradation setting screen 202 shown in FIG. 13 C. The user checks any of the gradation giving candidates in the designation check box 202-1 on the screen 202 to selectively designate a way of applying gradations as desired.

It may be configured to have items and functions used by the user to adjust coloration and density other than the setting contents shown in FIG. 13A to FIG. 13C.

The above embodiments were described on the precondition that the color printer for a three-dimensional print is used. But, the present invention is not limited to it and may be applied to a color printer or the like which can be used for either of the three-dimensional print and the ordinary print when the user selectively designate as desired.

The specific examples and filter examples described in the embodiments are quite common, and the invention is not limited to such examples and can be applied to another configuration if it can provide the same effect.

The system described in the above embodiments outputs the original image from a personal computer (PC) such as a client terminal to the color printer. But, the invention is not limited to it and may be applied to another system such as a copy machine. To realize such a case, the user inputs an original image by reading an original by an image reading section provided on the copying system and performs a prescribed instructing operation on the display operation section such as a touch-sensor monitor screen provided for the copy system.

In addition to the above-described embodiments, it may be configured to produce a three-dimensional print having a visually enhanced three-dimensional appearance by applying laminate fabrication to the image portion to be raised, applying a transparent toner, or applying emboss processing or the like to the expandable portion.

What is claimed is:

1. An image formation processing method, comprising:
   extracting a contour section of an image to be three-dimensionally raised from an original image;
   changing a color of the extracted contour section to enhance the image to be raised; and
   forming a three-dimensionally raised and enhanced image on a recording sheet according to the original image,
   wherein the original image is enhanced with color toners on a three-dimensionally raised portion of an expandable toner deposited on the recording sheet.

2. The image formation processing method according to claim 1, wherein the color of the extracted contour section is changed to a color exhibiting a brightness difference from a color of the image to be raised.

3. The image formation processing method according to claim 1, wherein the color of the contour section is changed to a color in a complementary color relationship with a color of the image to be raised.

4. An image formation processing apparatus, comprising:
an extraction unit that extracts a contour section of an image to be three-dimensionally raised from an original image;
an image processing unit that changes a color of the contour section extracted by the extraction unit to enhance the image to be raised; and
an image forming unit that forms a three-dimensionally raised and enhanced image on a recording sheet according to the original image,
wherein the original image is enhanced with color toners on a three-dimensionally raised portion of an expandable toner deposited on the recording sheet.

5. The image formation processing apparatus according to claim 4, wherein the image processing unit changes the color of the extracted contour section to a color exhibiting a brightness difference from a color of the image to be raised.

6. The image formation processing apparatus according to claim 4, wherein the image processing unit changes the color of the contour section to a color in a complementary color relationship with a color of the image to be raised.

* * * * *